United States Patent
Sonderegger

[15] 3,673,442

[45] June 27, 1972

[54] TEMPERATURE COMPENSATED PIEZOELECTRIC ACCELEROMETER

[72] Inventor: Hans Conrad Sonderegger, Sulz-Rickenbach Im Dornler, Switzerland

[22] Filed: Dec. 4, 1967

[21] Appl. No.: 701,799

Related U.S. Application Data

[63] Continuation of Ser. No. 430,629, Feb. 5, 1965.

[30] Foreign Application Priority Data

Feb. 14, 1964 Switzerland ..................... 2099/64

[52] U.S. Cl. ................................. 310/8.4, 310/8.7, 310/8.9
[51] Int. Cl. ...................................................... H04r 17/00
[58] Field of Search ......................... 310/8.4, 8.7, 8.2, 8.0; 340/10

[56] References Cited

UNITED STATES PATENTS

| | | | |
|---|---|---|---|
| 2,514,297 | 7/1950 | Smith | 310/8.7 |
| 2,714,672 | 8/1955 | Wright | 310/8.7 |
| 3,150,274 | 9/1964 | Pischinger | 310/8.7 |
| 3,171,989 | 7/1965 | Hatschek | 310/8.7 |
| 2,849,629 | 8/1958 | Kissinger | 310/8.4 |
| 2,894,317 | 7/1959 | Marks | 340/10 |
| 2,988,728 | 6/1961 | Marlow | 340/10 |
| 3,034,001 | 5/1962 | King | 310/8.7 |
| 3,075,099 | 1/1963 | Shoor | 310/8.4 |
| 3,060,333 | 10/1962 | Bradley | 310/8.4 |
| 3,070,996 | 1/1963 | Schloss | 310/8.4 |
| 3,222,919 | 12/1965 | Shoor | 310/8.4 |
| 3,281,613 | 10/1966 | Hatschek | 310/8.7 |
| 3,313,962 | 4/1967 | Sonderegger | 310/9.2 |
| 3,351,787 | 11/1967 | Kistler | 310/8.4 |

*Primary Examiner*—J. D. Miller
*Assistant Examiner*—Mark O. Budd
*Attorney*—Craig, Antonelli & Hill

[57] ABSTRACT

An acceleration measuring device which includes within a casing a piezo-electric system, a seismic mass and a relatively fixed abutment; temperature-compensating elements are provided at the outer end or ends of the piezo-electric system which have a coefficient of expansion greater than that of the materials of the adjacent elements.

13 Claims, 7 Drawing Figures

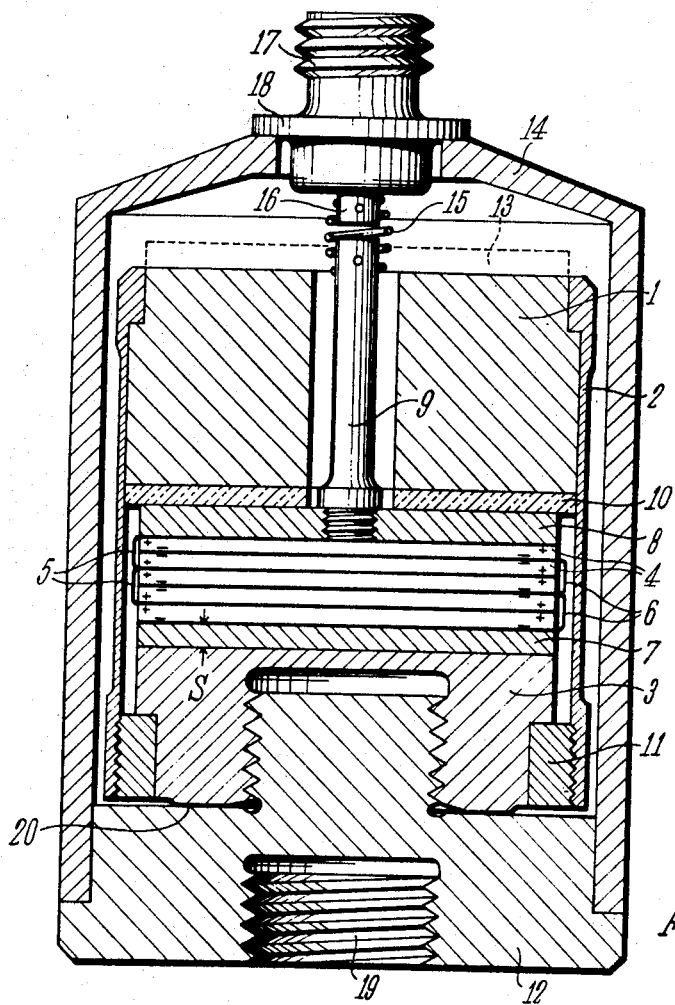
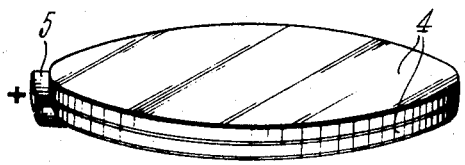
Fig.2
Fig.4
Fig.3
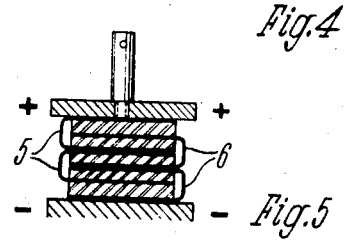
Fig.5
INVENTOR
HANS CONRAD SONDEREGGER
BY  Dicke + Craig
ATTORNEYS

INVENTOR
HANS CONRAD SONDEREGGER

BY Dicke + Craig
ATTORNEYS

TEMPERATURE COMPENSATED PIEZOELECTRIC ACCELEROMETER

This application is a continuation application of my co-pending application, Ser. No. 430,629, filed on Feb. 5, 1965, and entitled "Acceleration Measuring Device."

The invention relates to an acceleration measuring device which produces an output proportional to acceleration by pressing a seismic mass relatively to one or more piezo-electric discs, which output is then amplified electronically by known means and is registered on an indicator. Small quartz plates utilizing the longitudinal effect may be used as piezoelectric elements.

With known constructions of such apparatus the seismic mass is forced against the piezo-electric elements within the casing by clamping means and spring discs so that both positive and negative, externally acting accelerating forces can be measured. The measurement axis passes naturally always centrally through the piezo discs at right angles to the disc faces. In every other axis, the sensitivity should be, however, as small as possible. This type of pre-stressing has, however, the great disadvantage that in case of interaction of strong sound or vibration forces on the external body stress changes are transmitted to the piezo discs whereby the measuring apparatus becomes microphonic in operation. Furthermore, external temperature changes have as a consequence substantial radial stress changes of the piezo elements which also leads to false indications.

The primary object of the invention is to provide an acceleration measuring device which produces a sufficiently high output signal so that very small as well as large accelerations can be measured. Furthermore, the frequency range from about 50 kcs to nearly 0 should be usable. Furthermore, the sensitivity in every axis at 90° to the measuring axis is to be approximately 0°, and in all cases should not be more than 1 percent of the sensitivity in the main axis. Additionally, the apparatus should not be microphonic and is to incorporate separate temperature compensating means so that the temperature effects can be neglected.

The invention is described hereinafter by way of example with reference to the accompanying drawings wherein:

FIG. 1 is an axial cross section through an acceleration measuring device with a central connection;

FIG. 2 shows two piezo discs with electrode clamped together;

FIG. 3 shows an individual electrode before bending and as punched out;

FIG. 4 shows the individual electrodes bent to the final form before assembly;

FIG. 5 shows the system of assembly of the electrodes;

Figure 6:
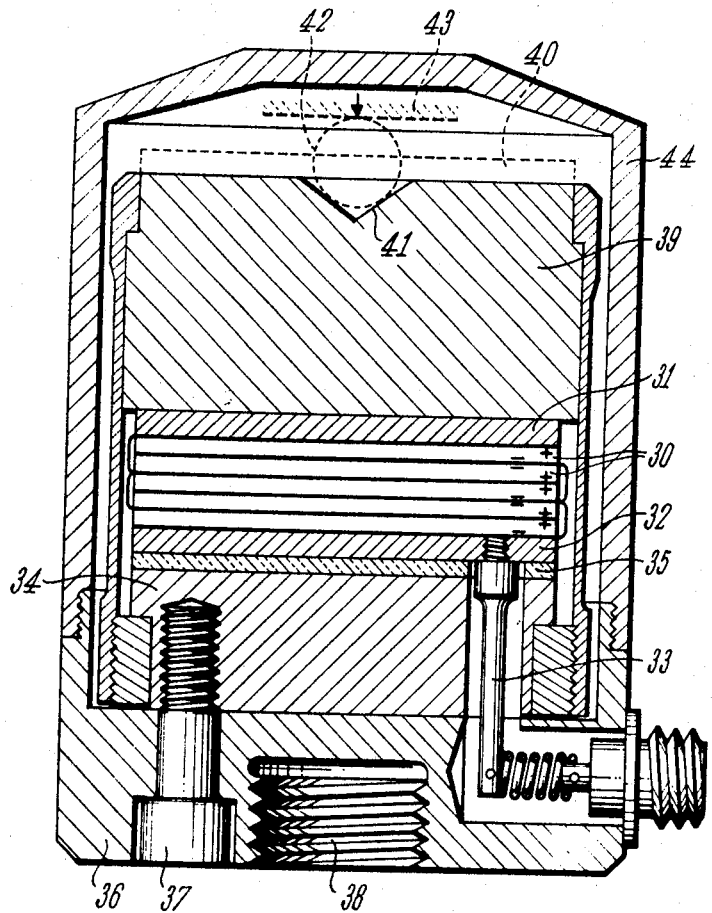
FIG. 6 is a cross section through an acceleration measuring device with a lateral connection.

As shown in FIG. 1, the acceleration measuring device according to the invention comprises a seismic mass 1 which is stressed or clamped by means of a thin-walled tubular clamping sleeve 2 against the base plate 3; a group of piezo-electric discs 4 is clamped between the seismic mass 1 and the base plate 3. An uneven number of discs, 1, 3, 5, 7, 9, etc. is used which are just so thick that they do not break during assembly. In the embodiment shown in FIG. 1, five piezo-electric discs 4 are employed. For this purpose the discs are laid one upon the other in such manner that respective outer surfaces producing a signal of the same polarity abut against one another. For transmitting the electric signal, electrodes 5 are used which are made from thin sheet metal. These sheet metal electrodes are punched out, as shown in FIG. 3, and are bent as shown in FIG. 4. Two piezo discs each are disposed between the plates of an electrode. The electrodes 5 supply positive signals, while the electrodes 6 supply negative signals.

FIG. 5 indicates how the arrangement of the electrodes conduct the negative signals towards the base plate 3 and the positive signals towards the top plate and thence to the take-off lead or pin.

Since the piezo discs 4 have normally a substantially higher thermal coefficient of expansion than the material of the faces pressing upon the disc assembly, that is to say, the seismic mass 1, the base plate 3 and an interposed insulating member 10; by reason of the mechanical pre-stress of all parts, additional shear stresses are transmitted to the faces of the piezo discs 4 during temperature changes which produce spurious signals that are independent of acceleration signals because the piezo discs have piezo-electric properties in two mutually perpendicular axes, i.e., in the axial and in the radial directions.

Thus, as mentioned above, in general the piezo discs 4 will have a substantially higher thermal coefficient of expansion than the faces pressing upon the disc assembly, that is to say, the seismic mass 1, the base plate 3 and an interposed insulating member 10. As a practical example, based on well-known data, in most cases quartz crystal discs with X-cut are conventionally used, having in the face planes two different coefficients of expansion. As is well known in the art, in the optical axis, this coefficient is of the order of $8.0 \times 10^{-6}$ C. whereas in the Y-axis, this coefficient is of the order of $14 \times 10^{-6}$ C. The latter axis is of great importance since crystals in the X-cut not only produce electrical charges on their plan surfaces by the application of perpendicular forces but also if the crystal is given compression or tension in direction of the Y-axis as produced by forces perpendicular to the first-mentioned forces and oriented in the plane of the faces of the discs 4. This secondary effect of producing a compensation signal is of main interest to this invention. The compensation effect is achieved by statically pressing a compensation disc consisting of a metal plate with a coefficient of expansion at least equal to or greater than $14.0 \times 10^{-6}$ C. against crystal discs. The compensation discs 7 and 8 in FIG. 1 are located on both sides of the crystal stack and have a thickness S at least equal to the thickness of a crystal disc 4. This arrangement ensures that temperature gradients entering from both sides into the crystal stack at once create a compensation signal by exerting shear forces in the direction of the Y-axis on both end crystals. In many arrangements where the path of the temperature gradient is known definitely, only one compensation disc 7 in front of the crystal stack in direction of the entering temperature gradient may be satisfactory. The size of the shear forces transmitted to the crystals is a function of the thickness S of the compensation discs 7 as well as of their coefficient of expansion. With these two variables, the dynamic temperature behavior of the complete instrument can be kept under control to a considerable degree, as will be explained by reference to FIG. 7.

Figure 7:
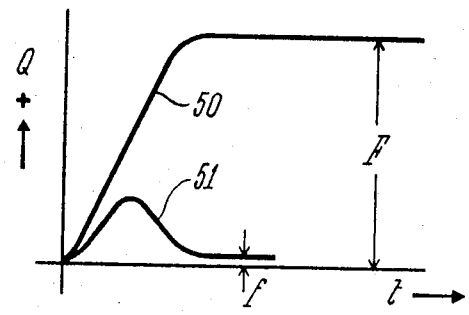
FIG. 7 shows curves of the influence of the temperature effect of normal and compensated acceleration devices in which the output or charge Q of the instrument is plotted as a function of the time $t$ during temperature changes.

Referring to FIG. 7, in which time $t$ is plotted along the abscissa and the change or output measurable at the instrument is plotted along the ordinate, no charge is measurable at time $t = 0$ since no acceleration acts on the instrument at that time. Assuming now that no acceleration continues to act on the instrument but that a change in temperature takes place, then with an apparatus without the temperature compensating discs of the present invention an output or charge increase takes place according to curve 50 which approaches a constant value when the new temperature condition is equalized over the entire instrument. However, with an apparatus according to the present invention, the compensating discs 7 and 8 commence to provide a compensation action shortly after the temperature change so that an output or charge curve 51 is obtained. The thickness of the temperature compensating discs has a significant influence on the residual value $f$; the same is true, to a lesser extent, of the mechanical pre-stress of the sleeve 2. Both optimum values thereof can be determined empirically for each new instrument.

This operation can be explained in greater detail as follows:

The first temperature effect when a temperature gradient enters into the casing of the instrument, is produced by stress changes of the pre-stressed crystal unit. As mentioned above, the pre-stressing of the crystals 4 with the seismic mass 1 onto the base plate 3 is achieved by an elastic thin-walled pre-stress sleeve 2, the pre-stress level being controlled by the ring screw 11. As soon as a temperature gradient enters the casing 12 it reaches immediately the pre-stress sleeve 2 causing it to relax its state of tension and thereby acting similar to a negative acceleration with respect to the seismic mass, thus producing an error signal as shown in FIG. 7 by curve 50. Microseconds later the compensation action of the compensation disc 7 begins to act, producing an opposite signal to the first error signal thus lowering the error signal to the compensated signal curve 51. The residual signal $f$ depends on the correct dimensioning of the compensation discs with regard to thickness as well as material as mentioned above.

The compensation discs 7, 8 thus have a double function. First, they have to be selected in order to allow for the compressed assembly of crystals 4, base plate 3, and seismic mass 1 to have approximately an over-all total coefficient of expansion equal to that of the pre-stress sleeve 2. For slow temperature changes this will result in smallest changes of the pre-stress level of the complete unit. Also for this action, the thickness S and the coefficient of expansion is of importance. The second function is, as explained above, to introduce a compensation signal by exerting a shear force on the adjacent crystal disc. Since the first error signal as well as the compensation signal appear on the same surfaces they will be transmitted to the electrode as algebraic sum of these two different influences.

It has been found that for the temperature compensating discs 7 and 8 materials such as brass or aluminum or alloys thereof are suitable. The compensating disc 8 can serve also as a signal or charge collecting disc because it is insulated from the casing by an insulating plate 10; a contact pin 9 is connected to the compensation disc 8 by a screw-thread, by riveting or welding so that signals can be taken to the connecting element 16 of a contact pin 17.

Precise adjustment of the pre-stress of the entire piezo assembly is of great importance especially as regards the influence on the transverse sensitivity. This pre-stress is adjustably set during assembly by means of threaded nipple 11 with simultaneous measurement of the output signal. The completely assembled measuring element is thereupon screwed onto the socket part 12 whereupon the unit is checked for sensitivity on a calibrating device. By selective step-by-step removal of material 13 from the mass 1, the sensitivity can be adjusted to ± 1 percent or better, to a standard calibration value, for example of 1 pC/g; 5 pC/g; 20 pC/g, etc.

In combination with the use of signal amplifiers which likewise have calibrated standard amplification factors of, for example, 50 mV/pC or 100 mV/pC the output voltage of the entire measuring device can be obtained supply by the multiplication of the two factors, for example:

$$5 \frac{pC}{g} \times 50 \frac{mV}{pC} = 250 \frac{mV}{g}$$

A simple evaluation of the signals is obtained thereby without the need for additional calculations or calibrations.

After the measuring element has been calibrated, a casing 14 is pressed over the socket 12. Now the connecting spring 15 which is welded to the pin 9 is passed through the upper opening in the casing 14 and is welded to the pin 16 of the connection 17. The chamber space within the casing 14 is thereafter evacuated and the connection 17 is welded along the flange part 18 to the casing 14. The measuring instrument is then ready for final checking.

Since the bell-shaped casing 14 which is formed of metal, is relatively stiff against bending at every point and since the measuring element, properly speaking, is connected with the socket 12 only by way of the bearing ring 20, external pressure and bending forces have no effect on the measurement.

The complete acceleration measuring device is either screwed by means of a threaded bore 19 onto the article to be measured, or a special adaptor screw can be provided for fitting into the bore 19.

A basically similar arrangement but with a lateral connection is shown in FIG. 6. The piezo discs 30 are again arranged between a top compensating disc 31 and a bottom compensating disc 32; the disc 32 is provided with an eccentrically placed screw thread to receive the pin 33. An insulating disc 35 is again provided between the disc 32 and the base plate 34. The measuring cell is screwed by means of screws 37 to the mounting socket 36 which is provided, in turn, with a central screw thread 38 for assembly onto the article to be measured. The seismic mass 39 is also so adjusted in its dimensions at the place 40 that a calibrated standard output signal is available. A central conical depression 41 is provided centrally of the mass 39 for receiving a ball 42; a static calibration can be obtained at any time by means of a press 43 applied to ball 42. During a measuring operation, however, the casing 44 is securely screwed into position.

The invention thus relates to an acceleration measuring device which has a satisfactory temperature compensation, a calibrated standard sensitivity, is not microphonic, and, because ceramic insulating materials only are used, the device can be operated near the Curie point of the piezo discs and if necessary can also be calibrated statically.

I claim:

1. Acceleration measuring device comprising a casing, said casing including a seismic mass, pressure-exerting means and a piezo-electric element, and at least one temperature compensating element of substantial thickness located under pressure between the seismic mass and one surface of the piezo-electric element, said temperature compensating element having a coefficient of expansion greater than that of the surfaces of the adjacent piezo-electric element and of the pressure-exerting means to compensate for changes in temperature, each temperature compensating element being so chosen in thickness that in the case of a temperature change acting on the device, the piezo-electric signal so obtained is reduced to the minimum.

2. Acceleration measuring device comprising a casing, said casing including a seismic mass, pressure-exerting means and a piezo-electric element, and at least one temperature compensating element of substantial thickness located under pressure between the seismic mass and one surface of the piezo-electric element, said temperature compensating element having a coefficient of expansion greater than that of the surfaces of the adjacent piezo-electric element and of the pressure-exerting means to compensate for changes in temperature, each temperature-compensating element having a thickness at least approximately equal to the thickness of a piezo-electric element.

3. Acceleration measuring device according to claim 2, characterized in that the piezo-electric element consists of a quartz crystal system, and in that each temperature-compensating element has a thickness at least approximately equal to the thickness of a quartz crystal.

4. An acceleration measuring apparatus with temperature compensation, which includes a seismic mass acting under pre-stress on a piezo-electric system, wherein the improvement comprises at least one temperature compensating disc arranged at least at one end of the piezo-electric system between said system and the adjacent abutment therefor, said temperature compensating disc having a coefficient of expansion which is greater than that of the material of the adjacent abutment and that of the piezo-electric system and is at least as thick as the piezo-electric element of said system.

5. An apparatus according to claim 4, wherein said temperature compensating disc is arranged between the seismic mass and said piezo-electric system.

6. An apparatus according to claim 5, wherein a temperature compensating disc is arranged between the piezo-electric system and a base plate.

7. An apparatus according to claim 6, wherein said piezo-electric system consists of an uneven number of individual piezo-electric discs, at least one of the temperature compensating discs consisting of electrically conductive material and resting as output electrode on one end disc of the piezo-electric system, and an electric insulating disc arranged between the seismic mass and the adjacent temperature compensating disc.

8. An apparatus according to claim 4, wherein a temperature compensating disc is arranged between the piezo-electric system and a base plate.

9. An apparatus according to claim 4, wherein said piezo-electric system consists of an uneven number of individual piezo-electric discs, at least one of the temperature compensating discs consisting of electrically conductive material and resting as output electrode on one end disc of the piezo-electric system, and an electric insulating disc arranged between the seismic mass and the adjacent temperature compensating disc.

10. An acceleration force measuring device having a housing, comprising a seismic mass, a piezo-electric element and temperature compensating elements consisting of metallic discs whose thickness is such as to introduce an equal negative compensation charge to the positive charge caused by a temperature gradient entering the pre-stressed housing of the device.

11. An acceleration measuring device with a seismic mass acting under pre-stress on a piezo-electric body consisting of at least one piezo-electric plate, characterized in that the piezo-electric body is provided on at least one side thereof with a temperature-compensating plate also under pre-stress which has a thickness that corresponds to at least half the thickness of the abutting piezo-electric plate and whose material has a coefficient of expansion greater than that of the piezo-electric body.

12. An acceleration measuring device with a seismic mass acting under pre-stress on a piezo-electric body consisting of at least one piezo-electric plate, characterized in that the seismic mass is so dimensioned and assembled that upon assembly thereof into the device it can be adjusted by selective step-by-step material removal in order that the output signal has a calibrated and standardized sensitivity, whereby the use of the output signal is greatly facilitated.

13. Acceleration measuring device comprising a piezo-electric assembly, said assembly comprising a sleeve-like inner casing, a seismic mass fixed within said casing, an end plate, a plurality of piezo elements in stacked pile form and temperature-compensating discs disposed between the seismic mass and the end plate, all said components being maintained under pre-stress within said inner casing, and the temperature compensating discs having a coefficient of expansion greater than that of the materials of the adjoining parts and being at least as thick as the piezo-element; and an outer casing structure surrounding said inner casing with a free space between the peripheral wall of the inner casing and the peripheral wall of the outer casing and at one end of the outer casing.

* * * * *